United States Patent
Shami et al.

(10) Patent No.: US 12,277,445 B2
(45) Date of Patent: Apr. 15, 2025

(54) PREDICTIVE RESOURCE ALLOCATION AND SCHEDULING FOR A DISTRIBUTED WORKLOAD

(71) Applicant: Ciena Corporation, Hanover, MD (US)

(72) Inventors: Gauravdeep Singh Shami, Ottawa (CA); Ziqiang Wang, Ottawa (CA); Marc Lyonnais, Gatineau (CA); Abdullah Bittar, Ottawa (CA)

(73) Assignee: Ciena Corporation, Hanover, MD (US)

( * ) Notice: Subject to any disclaimer, the term of this patent is extended or adjusted under 35 U.S.C. 154(b) by 77 days.

(21) Appl. No.: 18/313,814

(22) Filed: May 8, 2023

(65) Prior Publication Data

US 2024/0378079 A1   Nov. 14, 2024

(51) Int. Cl.
  *G06F 9/455*  (2018.01)
  *G06F 9/48*   (2006.01)
  *G06F 9/50*   (2006.01)
  *G06F 9/54*   (2006.01)

(52) U.S. Cl.
  CPC ............. *G06F 9/4881* (2013.01); *G06F 9/54* (2013.01)

(58) Field of Classification Search
  CPC .................................. G06F 9/4881; G06F 9/54
  See application file for complete search history.

(56) References Cited

U.S. PATENT DOCUMENTS

| | | | |
|---|---|---|---|
| 9,615,402 B2 | 4/2017 | Wu et al. | |
| 10,218,561 B2 | 2/2019 | Chen et al. | |
| 10,355,946 B1 * | 7/2019 | Dolas | H04L 43/0817 |
| 10,356,167 B1 * | 7/2019 | Dolas | H04L 67/1034 |
| 11,126,929 B2 | 9/2021 | Janulewicz et al. | |
| 12,175,297 B2 * | 12/2024 | Matus | H04L 41/12 |
| 2009/0003327 A1 | 1/2009 | Zhang et al. | |
| 2017/0289976 A1 | 10/2017 | Lai et al. | |
| 2018/0052714 A1 * | 2/2018 | Badjatia | H04M 15/66 |
| 2020/0104189 A1 * | 4/2020 | Gopalan | G06F 9/5088 |
| 2020/0310847 A1 * | 10/2020 | Schulze | H04L 67/10 |

(Continued)

FOREIGN PATENT DOCUMENTS

| | | |
|---|---|---|
| BR | 112021001658 A2 | 5/2021 |
| EP | 3823339 A4 | 8/2021 |

(Continued)

*Primary Examiner* — Hyun Nam
(74) *Attorney, Agent, or Firm* — Baratta Law PLLC; Lawrence A. Baratta, Jr.

(57) ABSTRACT

Systems and methods are provided for predicting how tasks should be allocated to available network resources. A method, according to one implementation, includes the step of receiving resource utilization metrics from each of a plurality of nodes arranged in a cluster, wherein the resource utilization metrics of each node include information related to utilization of one or more resources of the respective node over a plurality of time periods. The method also includes the step of predicting current and forthcoming resource availability of each node based on patterns of resource utilization over past and current time periods. In response to receiving a job request having multiple workload responsibilities, the method includes the step of allocating the workload responsibilities to one or more nodes based on the predicted current and forthcoming resource availability of each node in order to fulfill the job request.

20 Claims, 9 Drawing Sheets

(56) References Cited

U.S. PATENT DOCUMENTS

| | | |
|---|---|---|
| 2021/0152246 A1 | 5/2021 | Qi et al. |
| 2022/0156129 A1* | 5/2022 | Li ........................... G06F 9/542 |
| 2024/0160491 A1* | 5/2024 | Taneja ............... G06Q 10/0631 |
| 2024/0419611 A1* | 12/2024 | Neudorf .............. G06F 13/4221 |
| 2024/0428049 A1* | 12/2024 | Cintas .................... G06N 3/044 |

FOREIGN PATENT DOCUMENTS

| | | |
|---|---|---|
| EP | 4068836 A4 | 4/2023 |
| WO | 2007062569 A1 | 6/2007 |

* cited by examiner

PREDICTIVE RESOURCE ALLOCATION AND SCHEDULING FOR A DISTRIBUTED WORKLOAD

TECHNICAL FIELD

The present disclosure generally relates to networking systems and methods. More particularly, the present disclosure relates to scheduling the allocation of network resources among distributed nodes in a cloud-native environment for completing service function chains.

BACKGROUND

In the field of software development within a network domain, the term "cloud-native" defines an approach in which software can be built, deployed, and managed in a cloud-computing environment. The adoption of cloud-native technologies empowers organizations to build and run highly scalable and flexible applications in public, private, and hybrid clouds. In the creation of a cloud-native architecture, certain cloud-native features (e.g., containers, service meshes, microservices, immutable infrastructure, declarative application programming interfaces, etc.) are now being used to meet customer demands and minimize the typical burden associated with the deployment of software in a distributed system. Frequently, cloud-native applications may include a set of microservices that run in "containers." A container is a bundle or package that not only include a software application but also includes the associated dependencies of that application, which allows the container to be consistently deployed and executed in multiple virtualized environments while isolating the application from its environment.

BRIEF SUMMARY

The present disclosure is directed to systems, methods, Machine Learning (ML) models, and schedulers for optimizing the allocation of network resources based on historical and current resource utilization and availability. A method, according to one implementation, includes the step of receiving resource utilization metrics from each of a plurality of nodes arranged in a cluster. For example, the resource utilization metrics of each node include information related to utilization of one or more resources of the respective node over a plurality of time periods. The method further includes the step of predicting current and forthcoming resource availability of each node based on patterns of resource utilization over past and current time periods. In response to receiving a job request having multiple workload responsibilities, the method includes allocating the workload responsibilities to one or more nodes based on the predicted current and forthcoming resource availability of each node in order to fulfill the job request.

In accordance with further embodiments, the method may also include the step of scheduling the allocation of workload responsibilities to multiple nodes according to a sequential order. The method may be implemented in a scheduler, for example, which may be configured to collaborate with the plurality of nodes according to a Federated Learning (FL) strategy to allocate the workload responsibilities based on unique patterns of resource utilization of each node. The job request may be a Service Function Chain (SFC) request, and the workload responsibilities may include Virtual Network Functions (VNFs) of the SFC. The cluster may be configured to operate in a cloud-native environment having a public, private, or hybrid cloud architecture. In some embodiments, the method may convert the workload responsibilities into containers representing microservices to be performed in the cluster. The method may also include the step of using a Machine Learning (ML) model to predict the current and forthcoming resource availability of each node.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
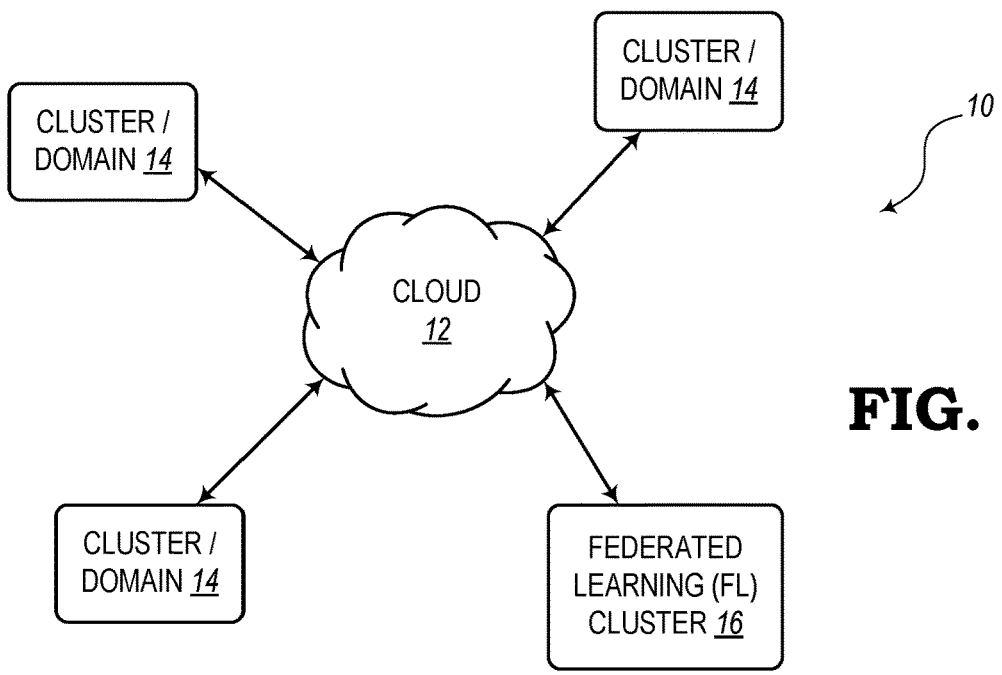
FIG. 1 is a schematic diagram illustrating an embodiment of a network having physical and/or virtual components.

FIG. 1 is a schematic diagram illustrating an embodiment of a network 10 that includes a cloud 12 and multiple clusters or domains 14. In this embodiment, the network 10 also includes a Federated Learning (FL) cluster 16. The network 10 may include a cloud-native architecture and may have any suitable combination of physical and/or virtual components for performing various network services. In one embodiment, the network 10 may be developed according to a Network Function Virtualization (NFV) for performing Virtual Network Functions (VNFs). Also, in some embodiments, the domains 14 and FL cluster 16 may include software applications that can be run on Virtual Machines (VMs) that may be monitored by a VM orchestrator or Software-Defined Network (SDN) controller, such as Open-Stack or Open Network Operating System (ONOS). In some embodiments, the network 10, operating in a cloud-native environment, may deploy VNFs in the form of containers running on a cloud platform.

Figure 2:
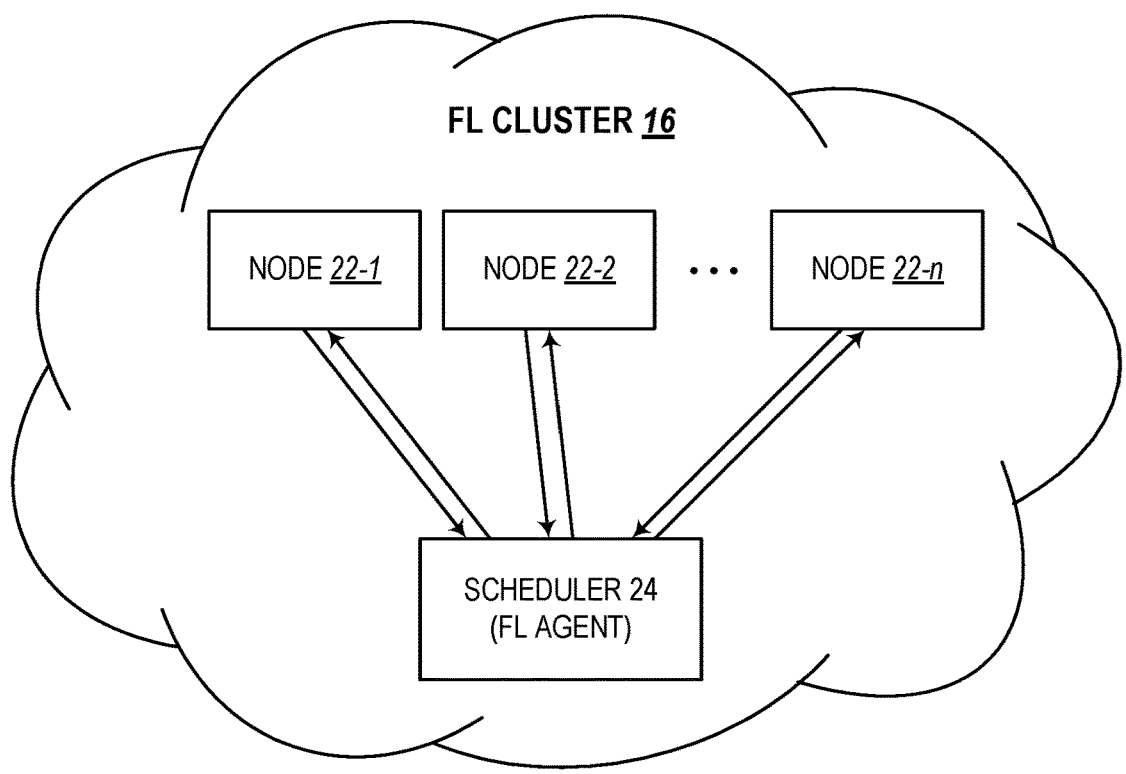
FIG. 2 is a schematic diagram illustrating an embodiment of the Federated Learning (FL) cluster shown in the network of FIG. 1.

FIG. 2 is a schematic diagram illustrating an embodiment of the FL cluster 16 shown in FIG. 1. As shown, the FL cluster 16 includes a plurality of nodes 22-1, 22-2, ..., 22-n and a scheduler 24 (e.g., FL agent). The nodes 22 may be configured as physical components (e.g., Network Elements (NEs), routers, switches, servers, etc.) and/or virtual components for executing VNFs. The nodes 22 may be arranged in any suitable configuration and may be configured to communicate with each other via physical or virtual communication links (not shown) to enable the execution of various network services. The scheduler 24 is configured to receive Performance Monitoring (PM) information from the nodes 22, where the PM information may be related to network performance parameters (e.g., bandwidth, latency, jitter, etc.) and/or resource utilization parameters (e.g., CPU utilization, memory utilization, etc.).

In response to receiving this PM information, the scheduler 24 is configured to detect patterns (e.g., seasonal patterns, time-of-day patterns, day-of-the-week patterns, etc.) with respect to each node 22. For example, the scheduler 24 may use Machine Learning (ML) or Deep Learning (DL) techniques for detecting these patterns. Also, the scheduler 24 is configured to store historical data related to previous PM information and previously determined patterns associated with each node 22 and to continue to collect current (or recent) information. In some embodiments, the scheduler 24 may use the current data to update or retrain ML models.

Using the historical and current data, the scheduler 24 may be configured to predict the availability of resources (e.g., processors, memory, etc.) of each node 22 when a job request is received. That is, when a job request (e.g., for performing a Service Function Chain (SFC)) is received in the FL cluster 16, the scheduler 24 is configured to break the job request into multiple parts (or tasks) and predict which resources within each of one or more nodes 22 will be available (in the near future) to perform these job parts or tasks. Thus, the scheduler 24 can use the historical and current information of the status of the nodes 22 to 1) determine or predict which NEs have sufficient resources to complete one or more of the tasks and 2) allocate the tasks to the various resources to complete the job effectively and efficiently.

In conventional systems, identifying and locating resources to build a Service Function Chain (SFC) can be challenging, especially when application requests fluctuate. Many conventional schedulers, as described in more detail below, are unable to accommodate SFC-type requests. Also, many conventional schedulers do not have forecasting or prediction capabilities. For example, Kubernetes is a well-known open-source container orchestration framework for automating software deployment, scaling, and management. Although Kubernetes provides some level of SFC resource allocation, its solutions are limited to only the current metrics of a cluster. Kubernetes does not use historical data and does not "predict" availability of resources in the near future when a workload is actually being accomplished.

Therefore, the scheduler 24 of the present disclosure has an advantage over Kubernetes in that the scheduler 24 can properly modify its performance based on the current job request as well as other pre-planned services associated with the same nodes 22 in the same FL cluster 16. In contrast, Kubernetes does not consider the past aspects or predicted future aspects of the FL cluster 16 and does not consider other service jobs when determining resource allocation for a new job request. The scheduler 24 of the present disclosure is configured to use historical data and DL to predict resource allocation in the FL cluster 16.

Figure 8A:
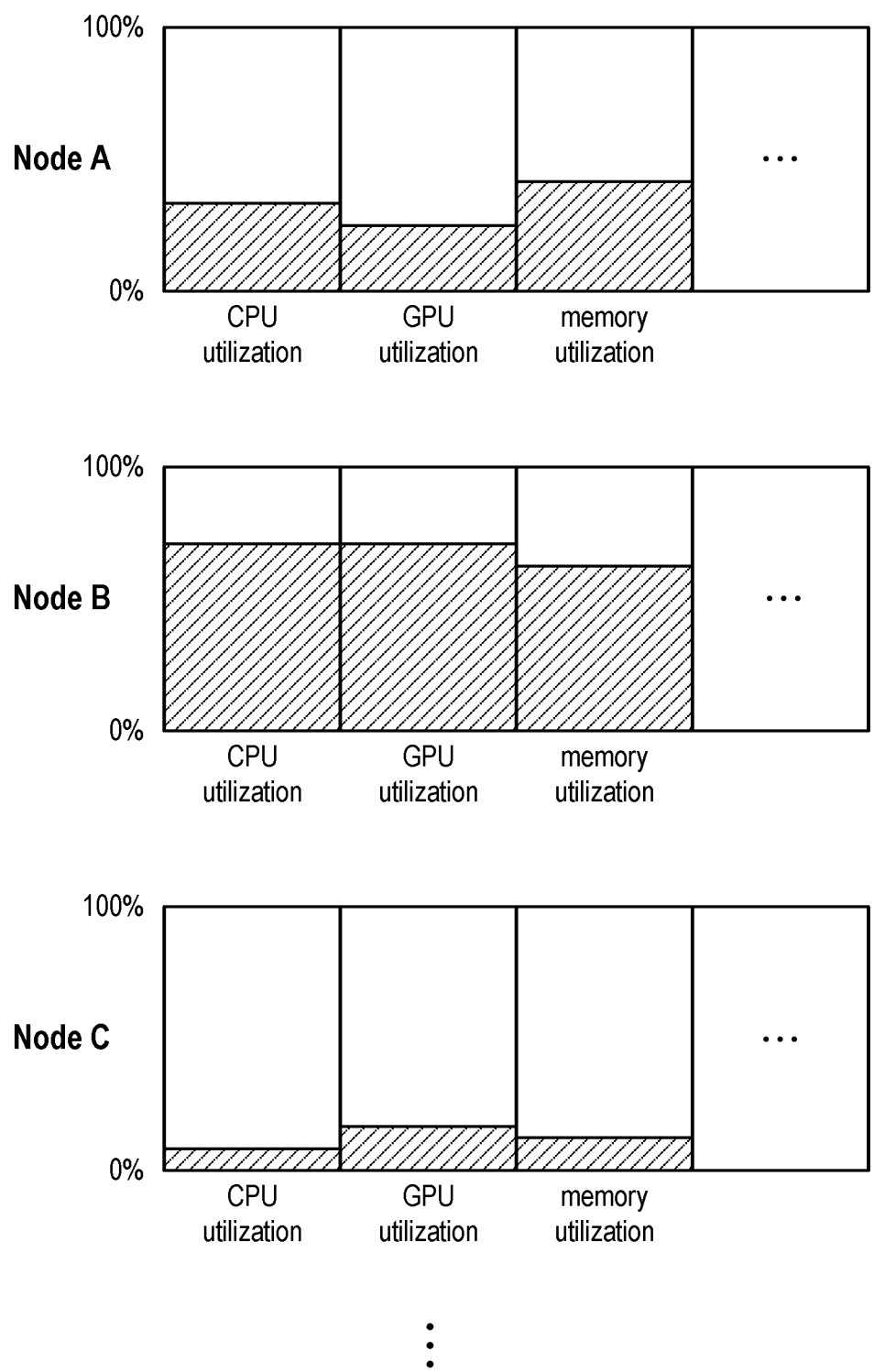
FIGS. 8A and 8B are graph showing an example of an allocation of resources in a plurality of NEs based on historical, current, and predictive resource utilization.
Figure 8B:
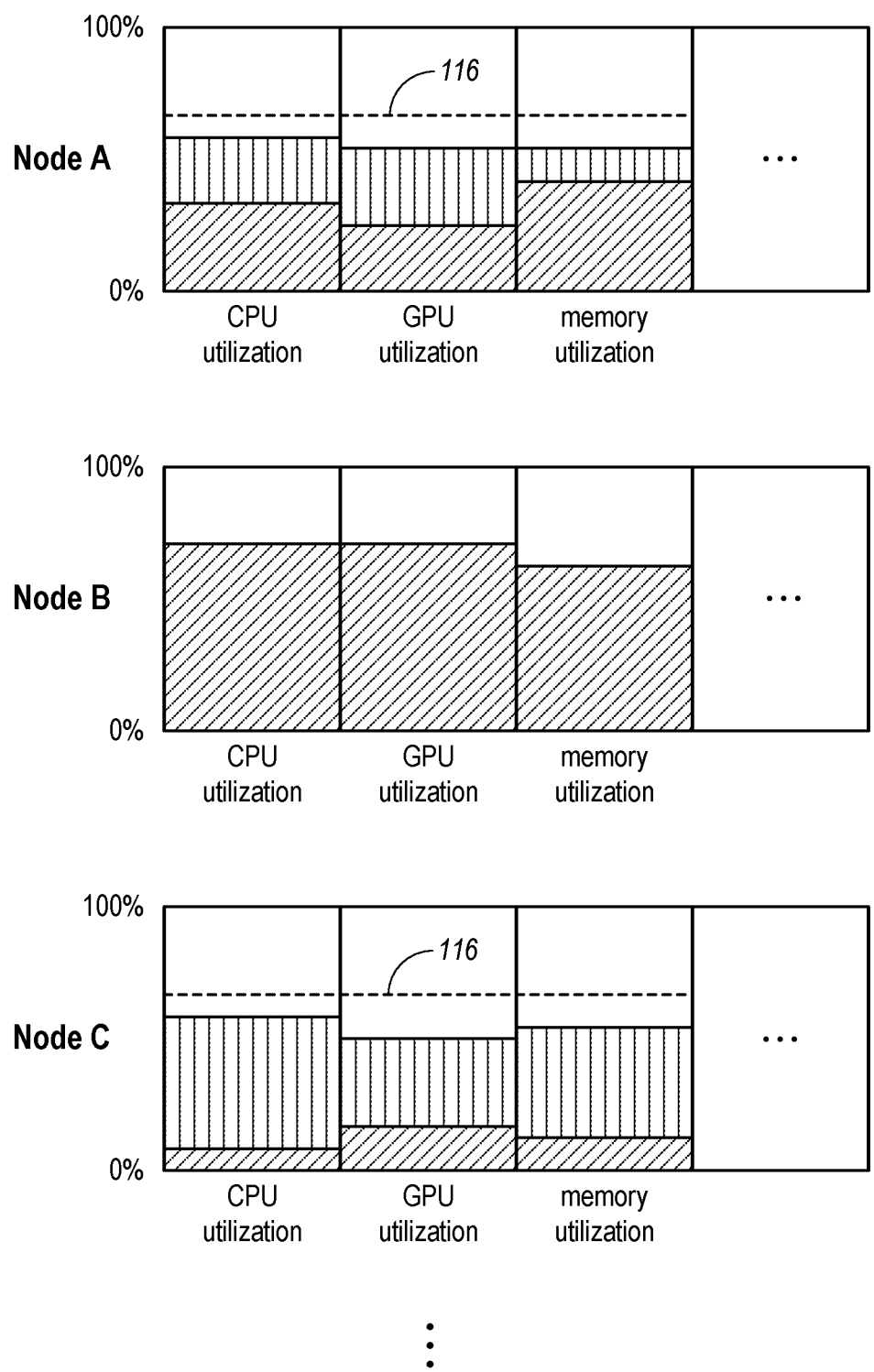

In addition, the scheduler 24 may be configured, according to some embodiments, to use a two-step procedure that is an improvement over the functionality of Kubernetes. The first operation of the two-step procedure includes "filtering," where the nodes 22 are checked against any specific requirements for performing various tasks of a job request received in the FL cluster 16. The second operation of the two-step procedure is "scoring." For example, the scheduler 24 is configured to assign a score for each of the remaining nodes 22 (i.e., those not filtered out) to choose the most suitable placement of tasks (or pods) of the job request. The scheduler 24 can also rank the nodes 22 based on the score and/or determine weights based on available resources in each node 22. For example, as shown in FIGS. 8A and 8B, the scheduler 24 can allocate or place tasks based on the availability of specific resources of each node 22 able to adequately perform the specific tasks.

In a Federated Learning (FL) environment, such as the FL cluster 16 of FIG. 2, the nodes 22 and scheduler 24 are configured to operate in a symbiotic or mutual manner to enable an optimization of resource allocation within the FL cluster 16. Thus, the two-step procedure described herein can use FL data to score the nodes 22. The first and second steps (i.e., filtering and scoring) are not merely based on the current cluster status, as is typically done in conventional systems. Instead, the FL cluster 16 of the present disclosure is configured to add historical data to the scheduling process to obtain better results.

More and more applications today are adopting a microservices-style distributed architecture. The evolution of technology in the cloud-native environment also brings innovation to network applications. In the recent past, network applications were mostly developed based on Network Function Virtualization (NFV). Traditionally, these applications ran in Virtual Machines (VMs) which are managed by a VM orchestrator and Software-defined Network (SDN) controller, such as OpenStack or ONOS. On the other hand, in a cloud-native environment, Virtual Network Functions (VNFs) are deployed in the form of containers running on a public, private, or hybrid cloud platform. As these applications and services grow in complexity, new challenges arise with respect to security, resilience, scalability, consistency, and observability. In turn, these challenges may affect the ability of these large distributed systems to sufficiently allocate resources in response to new job requests and other incoming application deployment requests. Nevertheless, the FL cluster 16 of the present disclosure is configured to meet these challenges by utilizing historical data of node resource utilization, current resource utilization, and predictive capabilities (using ML) to forecast resource availability needed to accomplish the incoming requests and effectively allocate the resources to the specific parts of the request to ultimately complete the requests in a timely and efficient manner. As shown in the graphs of FIGS. 10A-10D, the scheduler 24 (with the assistance of the nodes 22) are configured in a way to establish the FL cluster 16 as an environment in which resource allocation is performed in a much improved manner in comparison to conventional implementations in an effort to optimize these resource allocation efforts.

Figure 3:
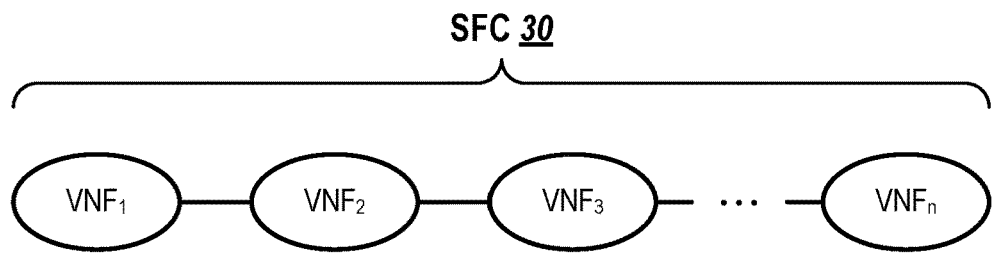
FIG. 3 is a diagram illustrating an example of a Service Function Chain (SFC) for performing a service in the network of FIG. 1.

FIG. 3 is a diagram illustrating an example of a Service Function Chain (SFC) 30 for performing a service in the network 10 or FL cluster 16. The SFC 30 can be defined as an ordered sequence of VNFs. As described in the present disclosure, in response a job request being supplied to the FL cluster 16, the SFC 30 may represent a number of tasks or VNFs for completing that job. The SFC 30 may be defined as directing the flow of tasks or VNFs therethrough to provide execution of end-to-end network services. Of note, while SFCs are described herein with reference to VNFs, those skilled in the art will appreciate the present disclosure contemplates use with workloads from the computing domain as well, including combinations of workloads, VNFs, etc.

The SFC 30 represents a specific way of deploying network related applications. The SFC 30 can use the programmability of Software Defined Network (SDN) control to develop a chain or link of the various VNFs. Since many virtual network services may be adapted for use in a cloud-native environment, the SFC 30 can be configured as a cloud-native SFC to focus on chaining together containerized instances of the deployed virtual functions.

SFCs differ from traditional web-based applications deployed in the cloud 12. In some embodiments, the SFC 30 may have specific and stringent requirements or expectations in order to function properly. Some expectations of the SFC 30 may include:
1. a large amount of computing and memory resources to run VNFs;
2. sufficient and predictable network bandwidth between VNFs instances;
3. latency criteria based on specific applications deployed;
4. ability to balance loads and route traffic among VNFs as traffic fluctuates;
5. ability to properly order the instances of VNFs in the path; and
6. ability to run services much longer than regular batch jobs.

Most conventional schedulers, as described in more detail below, lack two main capabilities. First, they do not have provisions to include SFC-specific requirements to allocate resources. Second, they lack visibility into node utilization patterns, which can help predict load levels of individual nodes and oncoming traffic requests. The scheduler 24 of the present disclosure is configured to overcome these deficiencies or shortcomings of the conventional schedulers.

That is, the scheduler 24 is capable of effectively establishing the SFC 30 to meet the above two points. Both of these point may be important for deploying VNFs chained in the SFC 30. Otherwise, network services deployed with the conventional cloud-native schedulers may not be performed effectively. For example, some resources may be overloaded while other may be under-utilized due to the inefficient allocation of resources by these conventional schedulers. As demonstrated in FIGS. 10A-10D, the predictive scheduler (e.g., scheduler 24) of the present disclosure was tested and was found to be far superior to conventional schedulers and was able provide results where there were significantly lower errors (i.e., tasks or VNFs that were improperly allocated to overwhelmed nodes) and significantly lower missed allocation opportunities (i.e., tasks or VNFs that were not provided to nodes having sufficient availability to handle the tasks or VNFs).

Figure 4:
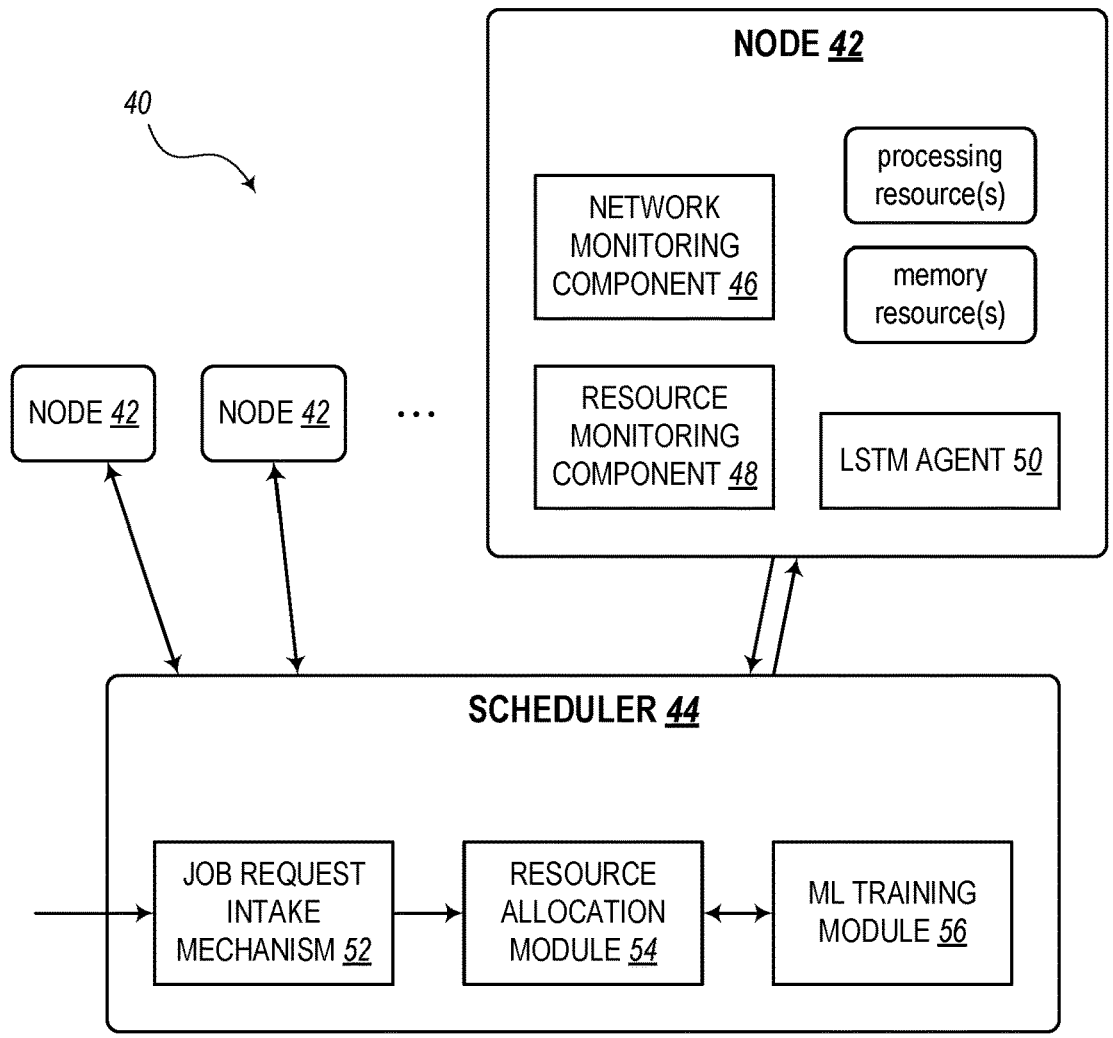
FIG. 4 is a block diagram illustrating an embodiment of elements, functionality, and interactions among a Network Element (NE) and scheduler of a FL cluster.

FIG. 4 is a block diagram illustrating an embodiment of a domain 40 or cluster of network elements. The domain 40, in this embodiment, may be similar to the FL cluster 16 of FIG. 2. As shown, the domain 40 includes a plurality of nodes 42 and a scheduler 44. Again, the domain 40 may include any suitable arrangement of physical or virtual links (not shown) connecting the nodes 42 in any suitable topology. The links allow the nodes to communicate with each other. Also, each node 42 may be configured with a number of elements and may include functionality and interactions to enable an optimization of resource allocation in the domain 40.

In the illustrated embodiment, the nodes 42 include a network monitoring component 46, a resource monitoring component 48, and a Long Short-Term Memory (LSTM) agent 50. The scheduler 44 may include a job request intake mechanism 52, which is configured to receive a job request (or SFC request). The job request is provided to a resource allocation module 54, which is configured to analyze the job request to determine resources needed to handle the various parts of the request, determine the resources in the nodes that are available, and properly allocate the various parts to the resources to complete the job. The resource allocation module 54 may also work with a Machine Learning (ML) training module 56, which may be configured to train any suitable type of ML model that takes historical and current data to calculate current and predictive resource allocation strategies.

The network monitoring component 46 may be configured to detect network PM data related to the nodes 42 themselves and their associated links. The network PM data may include operational parameters, which may be provided to the schedule as time-series data. The resource monitoring component 48 may be configured to analyze the resource utilization of various parts of the node 42, such as processors, CPUs, GPUs, memory, etc. The resource utilization data can be provided to the scheduler 44 as well, which may also be in a time-series format.

Each node 42 may include a ML-based framework that utilizes a Deep Learning (DL) model for individual node resource utilization prediction. For example, this may be implemented in the resource monitoring component 48 of the node 42. The LSTM agent 50 is configured to study utilization patterns, based on the data obtained from the resource monitoring component 48. In some embodiments, the LSTM agent 50 (or portions thereof) may instead be incorporated in the scheduler 44. The LSTM agent 50 and/or similar such agents can be used to learn and predict resource availability as well as other inter-nodal parameters (e.g., bandwidth, latency, jitter, etc.), which may be monitored by the network monitoring component 46.

The job request intake mechanism 52 of the scheduler 44 may be configured to receive a job request or other type of SFC-specific request from any appropriate source (e.g., user, software application, etc.). The resource allocation module 54 may be configured to break down the received job request into multiple task components or VNFs to determine what resources will be needed for completing the job and how long it will take to complete the job. In parallel, the resource allocation module 54 is configured to estimate node utilization patterns from historical and current data and the predict current and near future availability for handling the job. Thus, the resource allocation module 54 can then better allocate resources when SFC requests or other job requests are received by the job request intake mechanism 52.

The scheduler 44 is configured to receive prediction data from each of the LSTM agents 50 of the nodes 42. The scheduler 44 can utilize this information to make resource allocation decisions in the domain 40. Together, the LSTM agents 50 and the resource allocation module 54 work together (e.g., according to a Federated Learning (FL) application).

In some embodiments, the nodes 42 may be configured to pre-emptively share (e.g., upload, push, etc.) information obtained by the network monitoring component 46 and resource monitoring component 48. This information is shared with the scheduler 44 in order that the scheduler can determine trends or patterns of resource utilization by each individual node, which may depend on certain time-based scenarios. For example, some resources may be utilized more extensively during certain seasons of the year, during certain days of the week, or during certain times of the day, etc., while other resources may be utilized less extensively during certain times. In addition to these historical patterns, the nodes 42 also pre-emptively share current (recent) data in order that the scheduler 44 will know the immediate availability of various resources. Based on the previous and current data, the resource allocation module 54 of the scheduler 44 is configured to determine what resources are available immediately as well as those resources that are forecasted to be available throughout the execution of the requested job. For example, if the resource allocation module 54 determines from historical patterns that certain resources will be tie up performing other tasks at a certain time in the near future, then the resource allocation module 54 may avoid allocation of tasks that might overwhelm a node 42 during the job execution. It may be noted that the resource allocation strategies may even include changing how tasks are allocated based on predicted utilization in the near future and/or current data. Thus, allocation may be intentionally dynamic based on forecasted utilization patterns and may also be dynamic based on current information that is received.

Thus, the systems and methods of the present disclosure are configured to provide a data acquisition mechanism (e.g., network monitoring component 46 and resource monitoring component 48) for individual nodes 42 in the domain 40 or other cloud-native cluster. Also, the scheduler 44 uses the historical pattern of each individual node 42 and uses pattern prediction, such as using LSTM techniques. The scheduler 44 may be equipped with a SFC specific request intake mechanism (e.g., job request intake mechanism 52). The scheduler 44 may be configured to convert incoming requests into containers and microservices. Also, the scheduler 44 may include a prediction mechanism to check for node availability for the duration of the SFC request and to check for other SFC related parameters such as bandwidth, latency, jitter, etc. Also, the scheduler 44 may use the two-step procedure mentioned above with respect to a ranking algorithm that produces a list of eligible nodes 42 for implementing the SFC. The scheduler 44 can translate SFC requests into resource usage and use historical and current data to select the nodes 42 to which the VNFs can be deployed.

Figure 5:
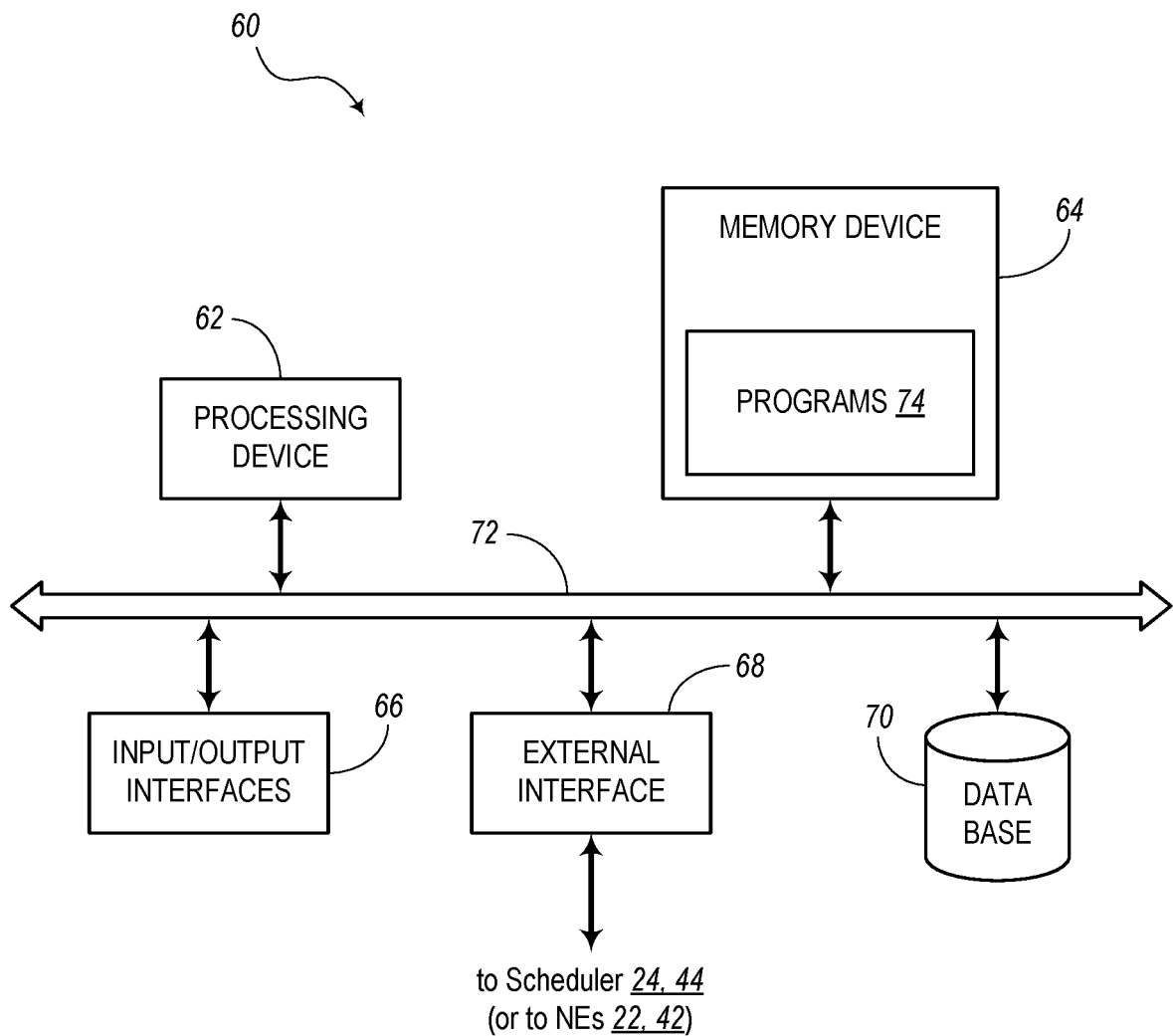
FIG. 5 is a block diagram illustrating an embodiment of any of the NEs and/or schedulers shown in the FL clusters of FIGS. 2 and 4.

FIG. 5 is a block diagram illustrating an embodiment of a computing device 60 that may represent any one or more of the nodes 22, 42 and/or schedulers 24, 44 shown in FIGS. 2 and 4. In the illustrated embodiment, the computing device 60 may be a digital computing device that generally includes a processing device 62, a memory device 64, Input/Output (I/O) interfaces 66, an external interface 68, and a database 70. It should be appreciated that FIG. 5 depicts the computing device 60 in a simplified manner, where some embodiments may include additional components and suitably configured processing logic to support known or conventional operating features. The components (i.e., 62, 64, 66, 68, 70) may be communicatively coupled via a local interface 72. The local interface 72 may include, for example, one or more buses or other wired or wireless connections. The local interface 72 may also include controllers, buffers, caches, drivers, repeaters, receivers, among other elements, to enable communication. Further, the local interface 72 may include address, control, and/or data connections to enable appropriate communications among the components 62, 64, 66, 68, 70.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Furthermore, the memory device 64 may be configured to include an operating system (O/S), not shown, and one or more programs 74. In some embodiments, the programs 74 may be implemented in any suitable combination of software or firmware in the memory device 64 (or other non-transitory computer-readable media) and/or hardware in the processing device 62. The programs 74 may include computer logic or instructions having steps or procedures for enabling the processing device 62 to perform certain functions or complete certain methods or processes.

For example, the programs 74 may allow the nodes 22, 42 to monitor PM data and resource utilization data and perform ML, DL, or LSTM techniques for predicting resource utilization. The programs 74 may allow the schedulers 24, 44 to break up an incoming job request (e.g., SFC request) into multiple workload responsibilities (e.g., tasks, VNFs, etc.) and determine what type of resources will be needed to accomplish the job responsibilities and also a timeframe when the job will be executed. The programs 74 also allow the schedulers 24, 44 to analyze the historical and current resource utilization information to determining upcoming or future availability of resources on the nodes. Then, based on the resources needed and the resources available at the present and in the near future, the programs 74 can allow the schedulers 24, 44 to properly allocate the job components or VNFs to the available resources as appropriate to complete job, such as by creating a VNF for multiple resources throughout a domain, network, cluster, FL environment, etc.

Figure 6:
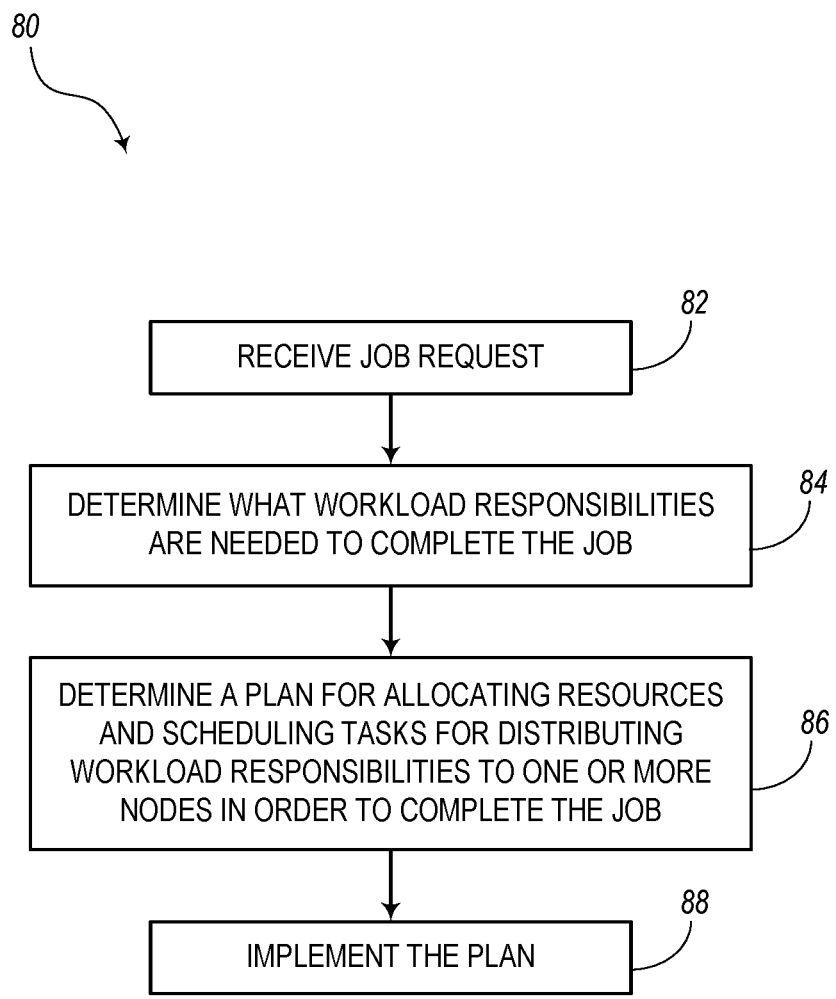
FIG. 6 is a flow diagram illustrating an embodiment of a general method for allocating resources in a FL environment.

FIG. 6 is a flow diagram illustrating an embodiment of a method 80 for allocating resources in a FL environment. The method 80 includes receiving a job request, as indicated in block 82, and then determining what workload responsibilities are needed to complete the job, as indicated in block 84. Next, the method 80 includes determining a plan for allocating resources and scheduling tasks for distributing the workload responsibilities to one or more nodes in order to complete the job, as indicated in block 86. Once this plan is determined, the method 80 includes implementing the plan, as indicated in block 88, thereby allocating those responsibilities to the available resource according to the task schedule. In some embodiments, the process 80 may also include monitoring the progress of the plan to determine if modifications need to be made, which may be based on nodes and/or resources behaving in a manner that does not match what had been predicted.

Figure 7:
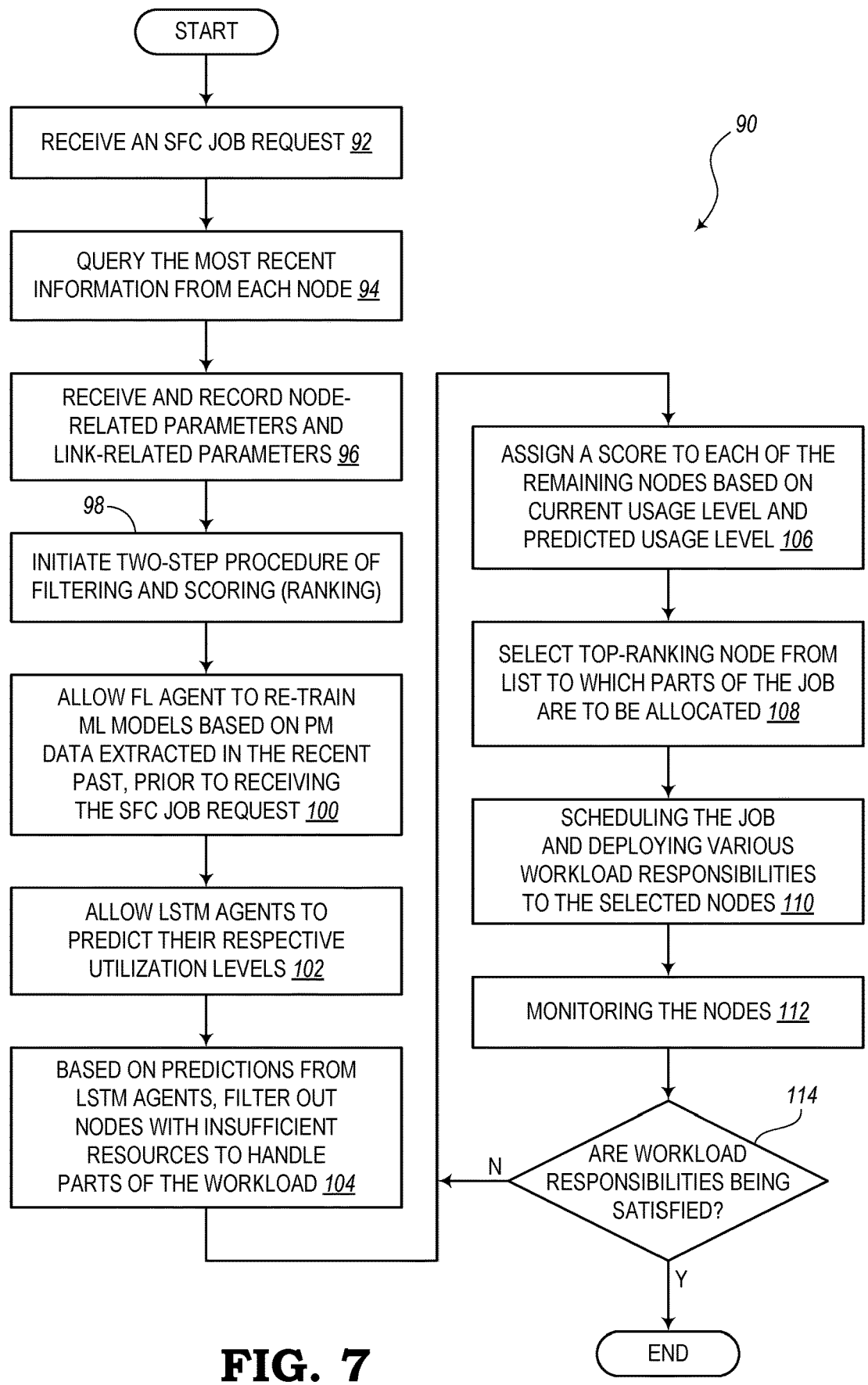
FIG. 7 is a flow diagram illustrating an embodiment of a method for allocating resources in response to receiving a job request.

FIG. 7 is a flow diagram illustrating an embodiment of a method 90 for allocating resources in response to receiving a job request. For example, the method 90 may be performed by a scheduler (e.g., scheduler 24, 44) and, in some cases, may be at least partially performed by one or more nodes (e.g., nodes 22, 42), hosts, or other associated components. In this embodiment, the method 90 includes the step of receiving an SFC job request, as indicated in block 92. The SFC job request can be initiated by a user, application, or other person or process. The method 90 also includes the step of querying the most recent information from each node or host, as indicated in block 94. This information may include total CPU usage, total memory usage, bandwidth of a Network Interface Card (NIC), disk read/write speed, status of I/O devices, etc.

The method 90 further includes receiving and recording various parameters, such as the number of containers in each node, capabilities or availability of CPUs, GPUs, memory, etc., as indicated in block 96. The various parameters may also include link-related information, such as bandwidth, latency limitations, networking traffic jitter, estimated execution times, etc. required by the request. Also, the method 90 includes the step of initiating the two-step procedure of filtering and scoring (or ranking) to select nodes from a cluster, as indicated in block 98. For example, FL agents may be requested to provide predicted utilization data for the time period requested by the SFC job request.

The method 90 may also include allowing FL agent to re-train models based on PM data extracted in the recent past, prior to receiving the SFC request, as indicated in block 100, and allowing the FL agents to predict their respective utilization levels (e.g., CPU, memory, bandwidth, etc.) for a respective resource (e.g., node, links, etc.), as indicated in block 102. This input can be provided to the SFC scheduler. The SFC scheduler may then be configured to filter out nodes that do not have enough resources to handle the workload, based on the predictions from the FL agents, as indicated in block 104. This may be based on comparing the required resources and predicted available resources during the estimated execution time period. The rest of the nodes may then be considered for the next steps.

In addition, the method 90 includes assigning a score to each of the remaining nodes based on their current usage level and predicted usage level, as indicated in block 106. The score may be calculated based on the average resource utilization during the estimated execution time period from the prediction of each FL agent according to the resource types listed in the user requirement. Also, the method 90 includes selecting the top-ranking nodes from this list to be allocated to the job, as indicated in block 108. Next, the method 90 performs the step of scheduling the job and deploying the various workload responsibilities to the selected nodes, as indicated in block 110. In some embodiments, the method 90 may further include the step of monitoring the nodes, as indicated in block 112. Next, the method 90 determines whether the workload responsibilities are being satisfied during the execution of the requested SFC job, as indicated in condition block 114. If not, the method 90 returns back to block 106 to re-evaluate the status of the requested job. Default auto-scaling mechanisms may be initiated to change resource allocations as needed.

FIGS. 8A and 8B are graphs showing an example of an allocation of resources in a domain or cluster having a plurality of nodes. In this example, utilization levels are shown for three nodes (i.e., Node A, Node B, and Node C) at a particular point in time. This point in time may represent historical information, current information, or predictive information and may be changeable over time. It should also be noted that the domain or cluster may include any number of nodes that can be managed by a corresponding scheduler for allocating resources according to availability. Also, the allocation may be based on historical data, current data, and predictive data of resource utilization patterns, resources availability, etc.

As can be understood from a comparison of the three nodes in the example of FIG. 8A, Node B is determined to be the most intently utilized node at this point in time, followed by Node A, and then Node C. Thus, at this time, Node C has the greatest availability, followed by Node A, and then Node B. Based on this observation and the related values, a scheduler (e.g., scheduler 24, 44) may be configured to determine how workload responsibilities are to be allocated to the different nodes. Also, based on the types of tasks needed (e.g., computing, storage, etc.), availability of each of the different resources of each node can be determined.

As shown in FIG. 8B, the workload responsibilities are allocated to the nodes according to availability. In this example, since Node B is already heavily utilized, it would be filtered out by the first step of the two-step procedure and would not receive any additional tasks, VNFs, etc. However, since Node C is the least utilized node and has the most availability, a large portion of the workload responsibilities are allocated to this node. Also, in order to spread out the responsibilities, some tasks may be supplied to Node A, which has some availability. During execution of the tasks, the nodes will continue to be monitored to see if their utilization levels increase or decrease. If a resource of one node begins to be overloaded, such as when a utilization level reaches a threshold 116, the scheduler can be appropriate modifications to allocate the remaining tasks to other nodes. In some embodiments, the threshold 116 may be adjustable, either by a network operator or automatically in a dynamic fashion.

Also, it may be determined that some resources of the nodes may be freed up or have a lesser load. In this case of increased availability, some extra tasks may be directed towards these resources, if necessary. In this way, the loads on each of the resources of each node can be utilized in an optimal manner to share the workload, so as not to overwhelm some nodes while other nodes are under-utilized.

In another example, suppose a cluster having 20 nodes receives an SFC workload request that require the use of four CPUs and 10% of all the nodes' total memory and is determined to require 80 seconds for complete execution. Also, suppose that the scheduler is configured to break up the workload request into 10-second time segments. In this case, there would be eight 10-second time segments. For each node, the FL agents 50 trained on the local historical data will make eight predictions (i.e., one for each time segment) on the required resource utilization. For each of the eight time segments, the scheduler will filter out the nodes that do not have enough resources. In this example, suppose seven nodes are filtered out, leaving 13 nodes to carry the workload. These remaining 13 nodes will be scored by calculating the average predicted resource availability during the eight time segments. Then, the scheduler picks the nodes which have the lowest average resource utilization (or highest availability). The priority of resource utilization may be equal, but can be changed in the future.

Figure 9:
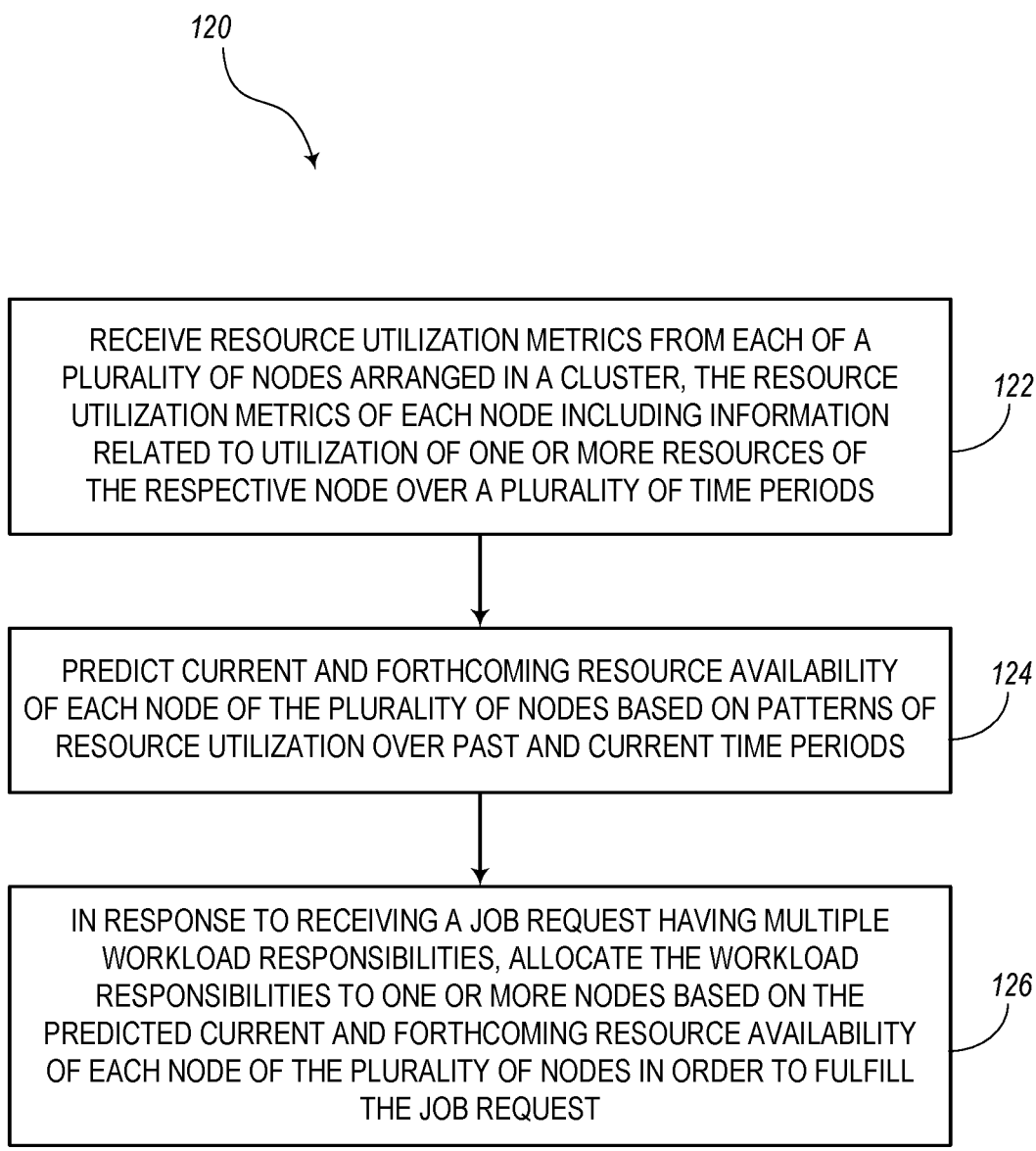
FIG. 9 is a flow diagram illustrating an embodiment of a method for allocating resources.
Figure 10A:
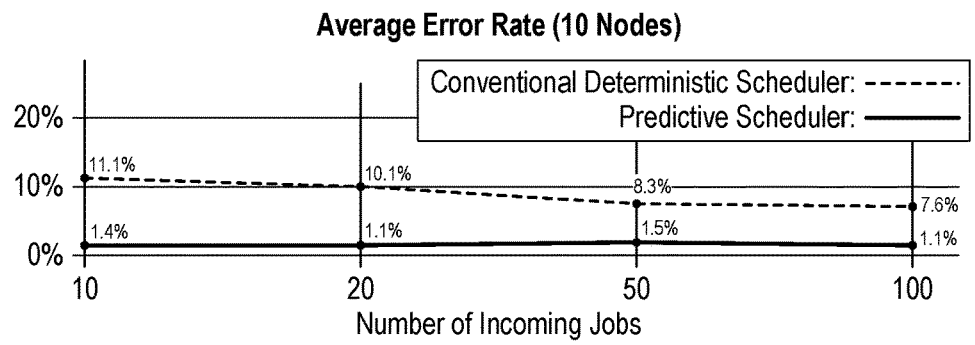
FIGS. 10A-10D are graphs showing errors and missed allocation opportunities for resource allocation in a network and comparing test results between a conventional deterministic scheduler and the scheduler of the present disclosure.
Figure 10B:
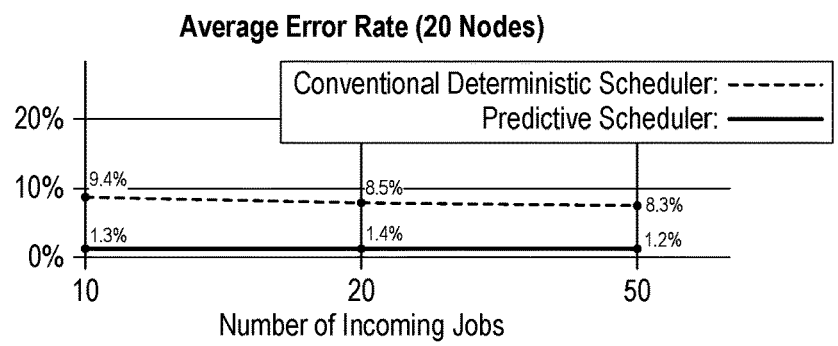
Figure 10C:
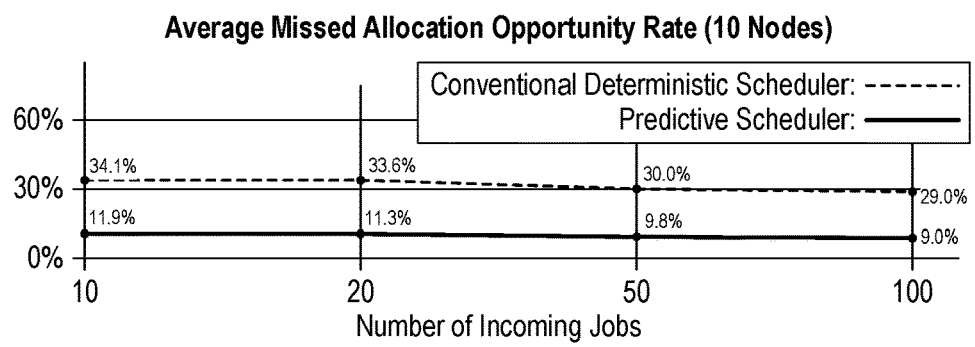
Figure 10D:
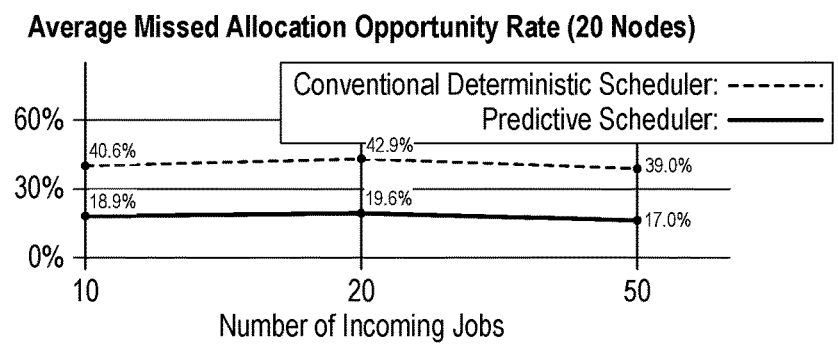

FIG. 9 is a flow diagram illustrating an embodiment of a method 120 for allocating resources. As shown in FIG. 9, the method 120 includes receiving resource utilization metrics from each of a plurality of nodes arranged in a cluster, as indicated in block 122. For example, the resource utilization metrics of each node include information related to utilization of one or more resources of the respective node over a plurality of time periods. The method 120 further includes predicting current and forthcoming resource availability of each node of the plurality of nodes based on patterns of resource utilization over past and current time periods, as indicated in block 124. In response to receiving a job request having multiple workload responsibilities, the method 120 includes allocating the workload responsibilities to one or more nodes of the plurality of nodes based on the predicted current and forthcoming resource availability of each node in order to fulfill the job request, as indicated in block 126.

In accordance with further embodiments, the method 120 may also include the step of scheduling the allocation of workload responsibilities to multiple nodes according to a sequential order. The method 120 may be implemented in a scheduler (e.g., scheduler 24, 44), which may be configured to collaborate with the plurality of nodes according to a Federated Learning (FL) strategy to allocate the workload responsibilities based on unique patterns of resource utilization of each node. The job request may be a Service Function Chain (SFC) request, and the workload responsibilities may include Virtual Network Functions (VNFs) of the SFC. The cluster may be configured to operate in a cloud-native environment having a public, private, or hybrid cloud architecture.

The method 120, in some embodiments, may convert the workload responsibilities into containers representing microservices to be performed in the cluster. The method 120 may also include the step of using a Machine Learning (ML) model to predict the current and forthcoming resource availability of each node. In response to receiving the job request, the method 120 may further include the steps of a) breaking the job request into the multiple workload responsibilities, and b) determining a list of resources needed to perform the workload responsibilities. In some embodiments, the method 120 may also include the steps of a) estimating an amount of time needed to perform the workload responsibilities, b) dividing the estimated amount of time into a number of time segments each having a predetermined duration, and c) allocating the workload responsibilities to the one or more nodes based on predicted resource availability of each node during each of the time segments in order to fulfill the job request.

Furthermore, the method 120 may also include the steps of a) filtering out a first set of nodes in response to predicting that the current and forthcoming resource availability of the set of nodes is insufficient to handle a portion of the workload responsibilities, whereby filtering out the first set of nodes leaves a remaining set of nodes, b) applying a score to each node of the remaining set of nodes based on the predicted current and forthcoming resource availability of the respective node, and c) allocating the workload responsibilities to one or more nodes of the remaining set of nodes based on the applied score. Based on unforeseen changes in resource availability of the nodes during execution of the workload responsibilities, the method 120 may also include the steps of a) predicting updated current and forthcoming resource availability of each node, and b) allocating remaining workload responsibilities of the job request to one or more nodes based on the updated current and forthcoming resource availability of each node in order to fulfill the job request.

The method 120 of FIG. 9 may be performed by a scheduler or other control device and may reside in the same cluster as the associated nodes or outside the cluster. The method 120 may be performed by a SDN controller or other control device of a Network Monitoring System. Similarly, methods of each of the nodes may also include corresponding functions for working with the scheduler, such as in a Federated Learning (FL) environment.

A node (e.g., node 22, 42), according to some embodiments, may therefore be arranged in an FL environment having a plurality of nodes and a scheduler (e.g., scheduler 24, 44). The node, in this embodiment, may include an LSTM agent (e.g., LSTM agent 50), a processing resource (e.g., processing device 62), and a memory resource (e.g., memory device 64). The memory resource may be configured to store a computer program having instructions that, when executed, enable the processing resource to perform certain FL steps to fulfill a job request. For example, the processing resource may be configured to share resource utilization metrics with the scheduler, where the resource utilization metrics may include information related to utilization of at least the processing resource and memory resource over a plurality of time periods. Also, the node may utilize the LSTM agent to predict current and forthcoming resource availability of at least the processing resource and memory resource based on patterns of resource utilization over past and current time periods. Finally, the processing resource may be configured to provide the predicted current and forthcoming resource availability (e.g., via the external interface 68) to the scheduler to enable the scheduler. Therefore, in response to the scheduler receiving a job request having multiple workload responsibilities, the scheduler is able to allocate the workload responsibilities to one or more of the plurality of nodes based on predicted current and forthcoming resource availability of each node in order to fulfill the job request. In addition to the patterns of resource utilization, the LSTM agent may further be configured to predict inter-nodal parameters related to bandwidth, latency, jitter, etc.

The systems and methods of the present disclosure describe schedulers and scheduling procedures for allocating resources in a network, domain, or cluster. When comparing the conventional schedulers with the schedulers of the present disclosure, it can be seen that the conventional schedulers are unable to perform at the level of the schedulers described herein. The following are conventional schedulers designed to be directly implemented within a container orchestrator environment:

Fuxi—a scheduler that handles many workloads in an example production data center which contains thousands of nodes. It features scalability and fault-tolerance.

Volcano—a high-performance computing scheduler that supports multiple features such as gang-scheduling, hierarchy job queuing and fair-share based on various criteria, preemption, and resource reservation, etc.

Kube-flux—scheduler that modifies a Kubernetes deployment to modify workloads to take into consideration the energy budget. The goal is to build an Energy Aware Data Center and ultimately reduce energy consumption to help build a greener planet.

Yunikorn—a Volcano scheduler including features like scheduling based on applications (gang-scheduling), flexible scheduling for quota distribution, and configurable sorting policies for an individual queue.

Trimaran—a load-aware scheduler focusing on averaging the resource utilization (CPU, Memory, GPU, etc.) across the cluster using a deterministic function.

In addition, some conventional schedulers may be defined as network-aware schedulers for combining the concept of existing co-scheduler with network measurement and control. Enforcing the deployment considering the network condition between each computing node. Examples of these network-aware schedulers designed for scheduling VMs instead of containers include:

QoS-driven scheduler—uses Deep Reinforcement Learning (DRL) to minimize the number of worker nodes (VMs) needed to be created to guarantee all tasks can be accomplished before their specified deadlines.

Omega—uses parallelism, shared state, and lock-free optimistic concurrency control to overcome the challenging of scaling and changing requirements.

kube-scheduler—a default Kubernetes scheduler that has stages exposed in the extension point allowing users to write plug-ins and customize its configuration. It implements the predicate and priorities to filter and sort suitable nodes for workloads.

As a proof of concept, an initial version of the scheduler of the present disclosure has been developed. In this example, the scheduler was created for use in Kubernetes controlled environments. It is believed that this approach enhances the existing Kubernetes scheduling mechanism by using federated learning inputs for SFC requests. Federated Learning (FL) networks are utilized to predict the future network characteristics in the next time slot by using FL agents in the cluster. It is also worth noting that, while this proof of concept focuses on SFC requests, the concepts can be easily extrapolated to any type of job request that has specific workload responsibilities or tasks. The following graphs show comparisons of the present scheduler with a conventional deterministic scheduler (i.e., Fuxi).

FIGS. 10A-10D are graphs showing errors and missed allocation opportunities for resource allocation in a network and comparing test results between the conventional deterministic scheduler and the "predictive" scheduler of the present disclosure. For validation, an approximation of the conventional scheduler was implemented based on data from the example data center. SFC requests are generated and implemented by both the conventional scheduler and the predictive scheduler. Errors represent occurrences where node resources were overwhelmed and could not handle or complete the tasks assigned to them. Missed allocation opportunities represent occurrences where node resources were available but were not utilized to complete the tasks of the SFC job request. The false positive and false negative results can be used to compare the efficiency of the approach implemented. Of course, lower error rates are preferred, and lower missed allocation opportunities are also preferred.

The graphs demonstrate that the forward-looking or predictive scheduler of the present disclosure clearly outperforms the conventional deterministic scheduler. Other metrics can be used to compare the results from the experiments to show that the number of requests successfully allocated and satisfactorily executed by the predictive scheduler are incrementally higher than the conventional scheduler.

More particular, the test was conducted on a dataset that was a cluster trace from the example product environment in 2018 and includes the resource usage of around 4000 nodes for a continuous 8-day period. The entire dataset for the cluster trace is around 280 GB, but 9 GB of the total was used, including a machine meta dataset, a machine usage dataset, a batch task dataset, and container meta dataset.

Therefore, the schedulers of the present disclosure represent an improvement over conventional schedulers. That is, the present scheduler helps to efficiently allocate resources to a cloud-native infrastructure. As such, any customer having similar requirements may benefit from the approach of the present disclosure. As compared to default schedulers, the embodiments of the present disclosure results in multiple times better (greater improvement) with respect to error rates and missed allocation opportunities.

It may be noted that the scheduler may be implemented as a software plugin and offered to service providers for improving their network services, thereby increasing QoS and QoE. Also, this may be implemented in cloud-based software to enable cloud providers with an optimization feature to extract the most compute power out of their infrastructure and private, public, or hybrid cloud-native architecture. The present schedulers can also be implemented in an orchestration, management, or control environment for improving a Network Management System (NMS), Network Operations Center (NOC), or other management or control devices.

Given that VNFs perform packet forwarding, it may be possible that the LSTM agents can predict forwarding capacity for SFCs. The systems and methods of the present disclosure may be configured to train the distributed ML models to predict specific requirements necessary for implementing the SFCs. As such, predicting forwarding capacity for specific links for SFC implementation may be possible if historical usage data for links is made available in the training stage.

It may be noted that the LSTM agents and other DL models may instead be replaced with less complex processing units in some cases. That is, the choice of ML models may be flexible and may depend on the scale of the network, cluster, domain, data center, etc. Also, the type of ML models utilized in the present disclosure may also be based on the complexity of a network topology, the availability of training resources (e.g., GPUs, CPUs, DPUs, power, latency, etc.) and the type and complexity of SFC job requests that may be received in a system.

ML training may be based on the past performance of and previously acquired data with respect to a network or cluster. The ML models may be trained based on this historical data and may further be updated or retrained as more data is made available. Dedicated systems can be commissioned for training and updating the ML models.

Also, it may be noted that SFCs in the present disclosure may be adopted to a containerized setting, where a cloud-native environment may be one example. The SFCs use VNFs, which, in the past, were Virtual Machines (VMs). The containers associated with the present disclosure may have different physical challenges versus VMs.

Conventional systems tend to reuse existing containerized resource allocators for SFC specific chains. However, there are many differences between a regular containerized job request and the SFC job request described in the present disclosure. A conventional scheduler that is not aware that a containerized job request is from an SFC perspective, then it is bound to struggle. As demonstrated in the graphs of FIG. 10, improvements can be made by being aware when there is an SFC-specific containerized job request.

The present schedulers utilize the ML training module 56 to consider the historical patterns of job flow requests and compute requests and leverages the knowledge gained various time-based information, such as the times of the day, the months of the year, etc., that the nodes tend to have ebbs and flows in requests and resource utilization. This allows for better placement or allocation of portions or functions of the requests to specific nodes. Every job function may require a specific set of compute resources, network resources, and/or infrastructure resources. Also, certain criteria may be enacted, such that there may be a need to limit the amount of latency or a need for a certain amount of bandwidth in a cluster or network. This too may be part of an SFC requirement.

The SFCs are not necessarily confined to virtual network functions, but may be expanded to other network functions and compute acceleration units, for instance. If additional processing (e.g., GPU-based processing) is needed in part of an SFC to make real-time decisions, this aspect may be part of the SFC as well. The scheduler that can make a decision that includes determinism and prediction.

In some embodiments, the LSTM agents 50 of each node 42 may be individually tasked to model the usage of that node 42. Then, each of these LSTM agents 50 may be connected to a single scheduler 44 or Federated Learning (FL) agent in an FL type environment. The scheduler 44 or FL agent acts as a central controller or determination unit that takes input from the individual LSTM agents 50 and then makes an informed decision where the resources go. The LSTM agents 50 represents the ML components of the individual distributed components or nodes. Also, ML training module 56 represents the ML component of the central controller. Both of these ML components can be constantly updating themselves on how node resources can be used as needed to complete various jobs, tasks, SFCs, etc.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions that, when executed, enables a processing device to:

receive resource utilization metrics from each of a plurality of nodes arranged in a cluster, the resource utilization metrics of each node including information related to utilization of one or more resources of the respective node over a plurality of time periods;

determine current resource availability and predict forthcoming resource availability of each node of the plurality of nodes based on patterns of resource utilization over past and current time periods; and in response to receiving a job request having multiple workload responsibilities:
  estimate an amount of time needed to perform the workload responsibilities;
  divide the estimated amount of time into a number of time segments each having a predetermined duration; and
  allocate the workload responsibilities to one or more nodes of the plurality of nodes based on the predicted forthcoming resource availability of each node during each of the time segments in order to fulfill the job request.

2. The non-transitory computer-readable medium of claim 1, wherein the instructions further enable the processing device to schedule the allocation of workload responsibilities to multiple nodes of the one or more nodes according to a sequential order.

3. The non-transitory computer-readable medium of claim 2, wherein the processing device is part of a scheduler configured to collaborate with the plurality of nodes according to a Federated Learning (FL) strategy to allocate the workload responsibilities based on unique patterns of resource utilization of each node.

4. The non-transitory computer-readable medium of claim 1, wherein the job request is a Service Function Chain (SFC) request, and wherein the workload responsibilities include any of Virtual Network Functions (VNFs) and workloads of the SFC.

5. The non-transitory computer-readable medium of claim 1, wherein the cluster is configured to operate in a cloud-native environment having a public, private, or hybrid cloud architecture.

6. The non-transitory computer-readable medium of claim 1, wherein the instructions further enable the processing device to convert the workload responsibilities into containers representing microservices to be performed in the cluster.

7. The non-transitory computer-readable medium of claim 1, wherein the instructions further enable the processing device to use a Machine Learning (ML) model to predict the forthcoming resource availability of each node.

8. The non-transitory computer-readable medium of claim 1, wherein, in response to receiving the job request, the instructions further enable the processing device to:
  break the job request into the multiple workload responsibilities; and
  determine a list of resources needed to perform the workload responsibilities.

9. The non-transitory computer-readable medium of claim 1, wherein, based on unforeseen changes in resource availability of the nodes during execution of the workload responsibilities, the instructions further enable the processing device to:
  predict updated current and forthcoming resource availability of each node; and
  allocate remaining workload responsibilities of the job request to one or more nodes based on the updated current and forthcoming resource availability of each node in order to fulfill the job request.

10. A scheduler comprising:

a processing device; and a memory device configured to store a computer program having instructions that, when executed, enable the processing device to receive resource utilization metrics from each of a plurality of nodes arranged in a cluster, the resource utilization metrics of each node including information related to utilization of one or more resources of the respective node over a plurality of time periods, determine current resource availability and predict forthcoming resource availability of each node of the plurality of nodes based on patterns of resource utilization over past and current time periods, and in response to receiving a job request having multiple workload responsibilities;

estimate an amount of time needed to perform the workload responsibilities;

divide the estimated amount of time into a number of time segments each having a predetermined duration; and allocate the workload responsibilities to one or more nodes of the plurality of nodes based on the predicted forthcoming resource availability of each node during each of the time segments in order to fulfill the job request.

11. The scheduler of claim 10, wherein the instructions further enable the processing device to collaborate with the plurality of nodes according to a Federated Learning (FL) strategy to a) allocate the workload responsibilities based on unique patterns of resource utilization of each nodes and b) schedule the allocation of workload responsibilities to multiple nodes of the one or more nodes according to a sequential order and based on the unique patterns of resource utilization.

12. The scheduler of claim 10, wherein the job request is a Service Function Chain (SFC) request, and wherein the workload responsibilities include any of Virtual Network Functions (VNFs) and workloads of the SFC.

13. The scheduler of claim 10, wherein the instructions further enable the processing device to use a Machine Learning (ML) model to predict the forthcoming resource availability of each node.

14. The scheduler of claim 10, wherein, in response to receiving the job request, the instructions further enable the processing device to break the job request into the multiple workload responsibilities, determine a list of resources needed to perform the workload responsibilities, estimate an amount of time needed to perform the workload responsibilities, divide the estimated amount of time into a number of time segments each having a predetermined duration, and allocate the workload responsibilities to the one or more nodes based on the predicted resource availability of each node during each of the time segments in order to fulfill the job request.

15. The scheduler of claim 10, wherein the instructions further enable the processing device to filter out a first set of nodes in response to predicting that the current and forthcoming resource availability of the set of nodes is insufficient to handle a portion of the workload responsibilities, wherein filtering out the first set of nodes leaves a remaining set of nodes, apply a score to each node of the remaining set of nodes based on the predicted current and forthcoming resource availability of the respective node, and allocate the workload responsibilities to one or more nodes of the remaining set of nodes based on the applied score.

16. The scheduler of claim 10, wherein, based on unforeseen changes in resource availability of the nodes during execution of the workload responsibilities, the instructions further enable the processing device to predict updated current and forthcoming resource availability of each node, and allocate remaining workload responsibilities of the job request to one or more nodes based on the updated current and forthcoming resource availability of each node in order to fulfill the job request.

17. A non-transitory computer-readable medium configured to store computer logic having instructions that, when executed, enables a processing device to:

receive resource utilization metrics from each of a plurality of nodes arranged in a cluster, the resource utilization metrics of each node including information related to utilization of one or more resources of the respective node over a plurality of time periods;

determine current resource availability and predict forthcoming resource availability of each node of the plurality of nodes based on patterns of resource utilization over past and current time periods;

in response to receiving a job request having multiple workload responsibilities, allocate the workload responsibilities to one or more nodes of the plurality of nodes based on the determined current resource availability and the predicted forthcoming resource availability of each node in order to fulfill the job request;

filter out a first set of nodes in response to predicting that the current and forthcoming resource availability of the set of nodes is insufficient to handle a portion of the workload responsibilities, wherein filtering out the first set of nodes leaves a remaining set of nodes;

apply a score to each node of the remaining set of nodes based on the predicted current and forthcoming resource availability of the respective node; and allocate the workload responsibilities to one or more nodes of the remaining set of nodes based on the applied score.

18. The non-transitory computer-readable medium of claim 17, wherein the instructions further enable the processing device to schedule the allocation of workload responsibilities to multiple nodes of the one or more nodes according to a sequential order.

19. The non-transitory computer-readable medium of claim 18, wherein the processing device is part of a scheduler configured to collaborate with the plurality of nodes according to a Federated Learning (FL) strategy to allocate the workload responsibilities based on unique patterns of resource utilization of each node.

20. The non-transitory computer-readable medium of claim 17, wherein the job request is a Service Function Chain (SFC) request, and wherein the workload responsibilities include any of Virtual Network Functions (VNFs) and workloads of the SFC.

* * * * *